US012669229B2

(12) United States Patent
Klarius et al.

(10) Patent No.: US 12,669,229 B2
(45) Date of Patent: Jun. 30, 2026

(54) LIGHTING DEVICE WITH LIGHT SOURCE ARRAY AND LENS ARRAY FOR A MOTOR VEHICLE

(71) Applicant: HELLA GMBH & CO. KGAA, Lippstadt (DE)

(72) Inventors: Alexander Klarius, Lippstadt (DE); Wolf Alexander Quitsch, Beckum (DE); Peter Rausch, Münster (DE); Piet Risthaus, Dortmund (DE); Alexander Schwan, Kamen (DE); Sebastian Völker, Delbrück (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 19/001,932

(22) Filed: Dec. 26, 2024

(65) Prior Publication Data

US 2025/0224088 A1 Jul. 10, 2025

(30) Foreign Application Priority Data

Jan. 4, 2024 (DE) ......................... 102024100194.1

(51) Int. Cl.
*F21S 41/151* (2018.01)
*F21S 41/143* (2018.01)
(Continued)

(52) U.S. Cl.
CPC ........... *F21S 41/151* (2018.01); *F21S 41/143* (2018.01); *F21S 41/153* (2018.01); *F21S 41/285* (2018.01);
(Continued)

(58) Field of Classification Search
CPC ...... F21S 41/151; F21S 41/143; F21S 41/285; F21S 41/153; F21S 41/663; F21W 2102/13
See application file for complete search history.

(56) References Cited

U.S. PATENT DOCUMENTS 9,476,558 B2 * 10/2016 Stefanov ............... F21S 41/285
10,232,763 B1 * 3/2019 Eckstein ............ G02B 19/0066
(Continued)

FOREIGN PATENT DOCUMENTS

DE 102017128125 A1 5/2019

*Primary Examiner* — Tracie Y Green
*Assistant Examiner* — Michael Chiang
(74) *Attorney, Agent, or Firm* — WARNER NORCROSS + JUDD LLP

(57) ABSTRACT

A lighting device for a headlight is provided. The lighting device includes a plurality of light sources and a collimating optic with a plurality of collimating lenses arranged next to one another in a row extending in a first direction. The collimating lenses have an entry surface and an exit surface through which light emitted by the light sources passes during operation of the lighting device. The lighting device also includes a secondary optic with an array of structures. During operation of the lighting device, light emitted by the collimating optic passes through the array of structures. The light sources have a light exit surface with at least two separately controllable portions, such that light emitted from a first portion of the light sources generates a first light function and light emitted from a second portion of the light sources generates a second light function.

13 Claims, 1 Drawing Sheet

(51) Int. Cl.

| | |
|---|---|
| ***F21S 41/153*** | (2018.01) |
| ***F21S 41/20*** | (2018.01) |
| ***F21S 41/663*** | (2018.01) |
| *F21W 102/135* | (2018.01) |
| *F21Y 103/20* | (2016.01) |
| *F21Y 115/10* | (2016.01) |

(52) U.S. Cl.

CPC ...... *F21S 41/663* (2018.01); *F21W 2102/135* (2018.01); *F21Y 2103/20* (2016.08); *F21Y 2115/10* (2016.08)

(56) References Cited

U.S. PATENT DOCUMENTS

| | | | | |
|---|---|---|---|---|
| 11,143,376 | B2 * | 10/2021 | Nishimura ............ | F21S 41/255 |
| 11,204,147 | B1 * | 12/2021 | Park ........................ | F21S 41/43 |
| 2013/0021815 | A1 * | 1/2013 | Koizumi ............... | F21S 43/249 362/511 |
| 2018/0202624 | A1 * | 7/2018 | De Lamberterie ... | F21S 41/285 |
| 2019/0195453 | A1 * | 6/2019 | Sakamoto ............. | F21S 41/322 |
| 2019/0226658 | A1 * | 7/2019 | Kawai ..................... | F21S 41/43 |

* cited by examiner

LIGHTING DEVICE WITH LIGHT SOURCE ARRAY AND LENS ARRAY FOR A MOTOR VEHICLE

CROSS-REFERENCE TO RELATED APPLICATIONS

The present application claims the benefit of German Patent Application No. 10-2024-100-194.1, filed Jan. 4, 2024, the disclosure of which is incorporated by reference.

FIELD OF THE INVENTION

The present invention relates to a lighting device for a motor vehicle.

BACKGROUND OF THE INVENTION

A lighting device of the aforementioned type is known from DE 10-2021-122-953 B3. The lighting device described therein, which is designed in particular as a headlight for a motor vehicle, comprises a plurality of light sources from which light is emitted during operation of the lighting device, a collimating optics with a plurality of collimating lenses, each having an entry surface and an exit surface through which the light emitted from the light sources passes, and a secondary optics with a plurality of arrays of cylindrical lenses through which the light emitted by the collimating optics passes. In this case, the collimating lenses are arranged in at least two rows, wherein in each of the rows at least two of the collimating lenses are arranged next to one another in a first direction and wherein the rows are arranged next to one another in a second direction perpendicular to the first direction. An aperture is arranged on each of the entry surfaces of the collimating lenses, which is formed as an opening in an opaque layer on the entry surface. These apertures are designed differently for different rows. The lower edge of individual apertures on the entry surfaces of the collimating lenses can be imaged by the optics of the lighting device formed by the collimating optics and the secondary optics as a horizontal cut-off line into the exterior space of the motor vehicle. The three rows arranged one above the other disclosed in DE 10-2021-122-953 B3 can be used to generate a high beam, an apron component of a low beam and a range component of a low beam as different light functions.

A disadvantage of such lighting devices known from the state of the art is the different warm appearance with different functions, such as parts of a low beam and a high beam. Warm appearance here refers to the externally visible design of the lighting device during operation.

The problem underlying the present invention is therefore the creation of a lighting device of the type mentioned at the beginning, which has a constant warm appearance despite the generation of different light functions.

SUMMARY OF THE INVENTION

According to one embodiment, it is provided that at least one of the light sources, in particular each of the light sources, has a light exit surface with at least two separately controllable portions, wherein the lighting device is configured such that the light emitted from a first portion of the at least one light source generates a first light function and that the light emitted from a second portion of the at least one light source generates a second light function. This design makes it possible to generate a plurality of light functions with a series of collimating lenses arranged next to one another. Furthermore, a consistent warm appearance can be guaranteed.

It may be provided that the first light function is a high beam or part of a high beam and that the second light function is a low beam or part of a low beam. For example, the second light function may be the apron component of a low beam.

The at least two separately controllable portions of the at least one light source can be arranged next to one another in the light exit surface in a first direction and/or in a second direction, in particular wherein the first direction corresponds to a horizontal direction when the lighting device is installed in the motor vehicle and wherein the second direction corresponds to the vertical direction when the lighting device is installed in the motor vehicle.

It is possible that the optics of the lighting device formed by the collimating optics and the secondary optics are configured to image the light exit surface of the at least one light source into the exterior space of the motor vehicle. In particular, the second portion of the at least one light source may have an edge arranged in the light exit surface which faces the first portion of the at least one light source, wherein the optics of the lighting device are configured to image this edge of the second portion of the light exit surface of the at least one light source arranged in the light exit surface as a horizontal cut-off line into the exterior space of the motor vehicle. If the portion of the light source generating the second light function emits light and the adjacent first portion does not emit light, a sharp line between a luminous and a non-luminous area is automatically created. This sharp line is then imaged as a horizontal cut-off line into the exterior space of the vehicle. In this manner, apertures are no longer required to create a cut-off line, the boundaries of which must be imaged into the exterior space of the vehicle.

It may be provided that each of the separately controllable portions of the at least one light source is designed as a light-emitting diode (LED) or as a group of light-emitting diodes, the active surfaces of which together form the light exit surface of the at least one light source. At least one of the light sources, preferably each of the light sources, can be designed as a solid-state LED array. This allows the advantages of SSL technology to be utilized, which can consist in particular of a small installation space and high efficiency.

It is possible that at least one of the light sources, preferably each of the light sources, comprises two to six light-emitting diodes. Alternatively, more than six light-emitting diodes may be provided per light source. If there are two light-emitting diodes, the first and second portions each consist of one light-emitting diode. If there are more than two light-emitting diodes, the first and/or the second and/or optionally a further portion and/or optionally a plurality of further portions may have more than one light-emitting diode.

It may be provided that the active surfaces of the light-emitting diodes of the at least one light source, preferably the active surfaces of the light-emitting diodes of each of the light sources, have a size of 0.3 $mm^2$ to 2.0 $mm^2$, in particular have a size of 0.4 $mm^2$ to 1.5 $mm^2$, preferably have a size of 0.5 $mm^2$ to 1.0 $mm^2$. In particular, the total active surface area of the light-emitting diodes of a light source can be equal to 6 $mm^2$ or less than 6 $mm^2$ in size.

It is possible that one of the collimating lenses is assigned to each of the light sources in such a manner that the light emitted from the light source passes successively through the entry surface and the exit surface of the assigned collimating lens.

It may be provided that the at least one array of structures of the secondary optics is designed as an array of lenses. In particular, the lenses of the at least one array of lenses may be designed as cylindrical lenses, in particular wherein the cylindrical lenses are arranged next to one another in the first direction and the cylindrical axes of the cylindrical lenses extend in the second direction. This arrangement of the cylinder axes in a vertical direction achieves a horizontal spread of the light distribution generated by the lighting device.

BRIEF DESCRIPTION OF THE DRAWINGS

The invention is discussed in more detail below with reference to the accompanying drawings. In the figures.

In the figures, identical or functionally identical parts are indicated with the same reference signs. A Cartesian coordinate system is shown in the figures for better orientation.

DETAILED DESCRIPTION OF THE CURRENT EMBODIMENTS

Figure 1:
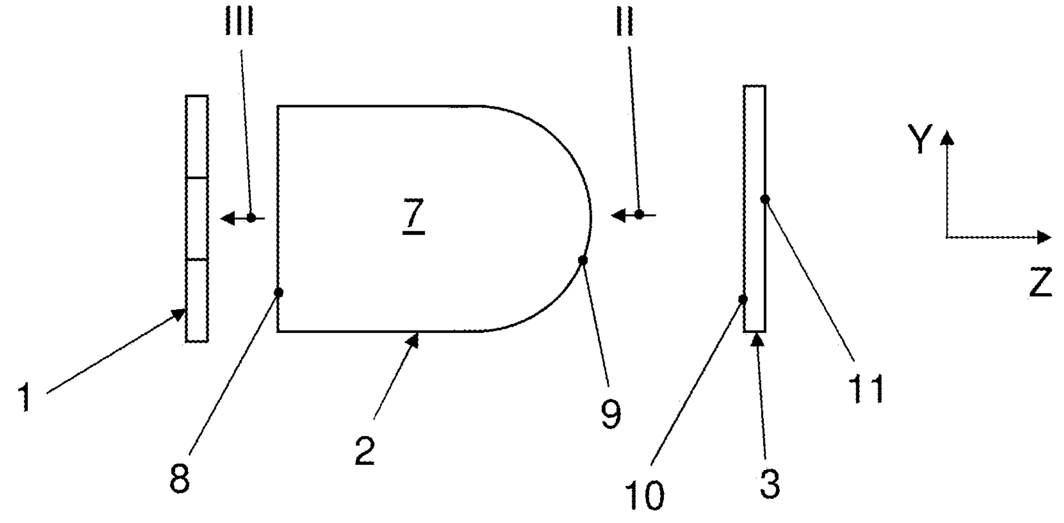
FIG. 1 shows a schematic side view of a lighting device according to the invention.
Figure 2:
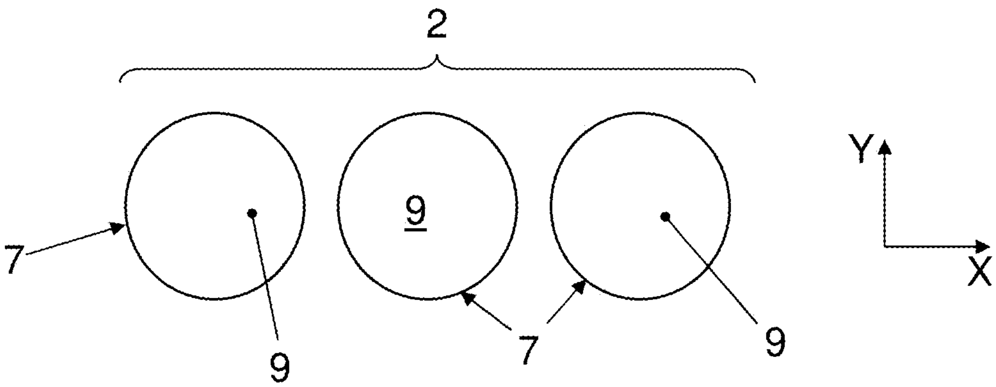
FIG. 2 shows a view of the collimating optics of the lighting device as shown by arrow II in FIG. 1.

The embodiment of a lighting device according to the invention shown in the figures is designed as a headlight. The lighting device comprises a plurality of light sources 1, collimating optics 2 and secondary optics 3 (see FIG. 1).

Figure 3:
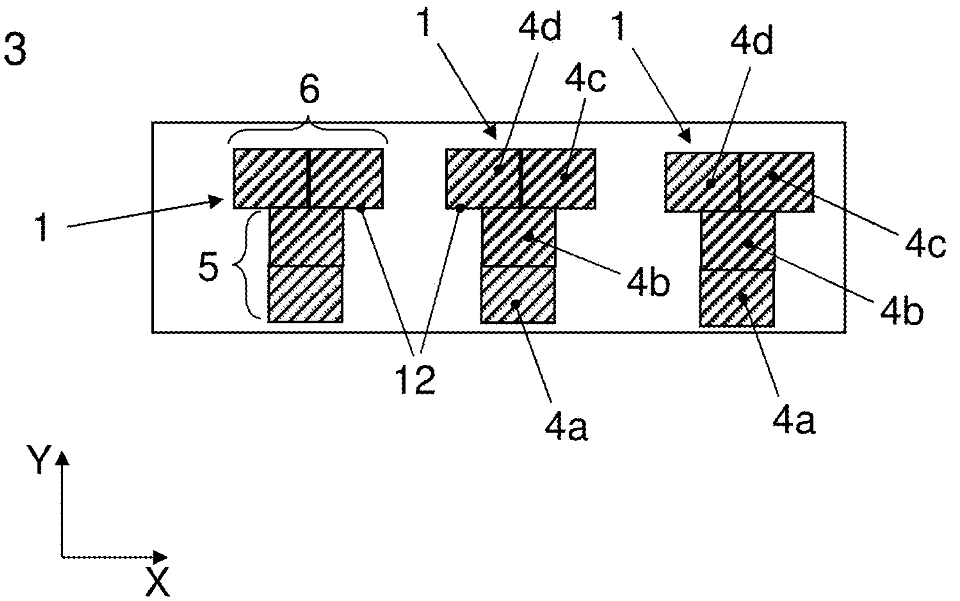
FIG. 3 shows a view of the light sources of the lighting device as shown by arrow III in FIG. 1.

The light sources 1 are arranged in a row extending in a first direction X, next to one another and at a distance from one another (see FIG. 3). If a plurality of these rows are provided, the rows of light sources 1 are arranged next to one another in a second direction Y perpendicular to the first direction X and at a distance from one another. In particular, the first direction X corresponds to a horizontal direction when the lighting device is installed in the vehicle, whereas the second direction Y corresponds to a vertical direction when the lighting device is installed in the motor vehicle. The light sources 1, the collimating optics 2 and the secondary optics 3 are arranged next to one another and at a distance from one another in a third direction Z, which is perpendicular to the first and second directions X, Y (see FIG. 1). In particular, the third direction Z corresponds to the longitudinal direction of the vehicle when the lighting device is installed in the vehicle.

The light sources 1 each comprise a plurality of light-emitting diodes 4*a*, 4*b*, 4*c*, 4*d*, from which light is emitted during operation of the lighting device. The active surfaces of the light-emitting diodes 4*a*, 4*b*, 4*c*, 4*d* together form the light exit surface of the respective light source 1. At least one of the light sources 1, preferably each of the light sources 1, can be designed as a solid-state LED array.

In the illustrated embodiment example, each of the light sources 1 has two light-emitting diodes 4*a*, 4*b* arranged one above the other in the Y direction. These two light-emitting diodes 4*a*, 4*b* form a first portion 5 of the light source 1 for each of the light sources 1. Furthermore, for each of the light sources 1 in FIG. 3, two light-emitting diodes 4*c*, 4*d* are arranged next to one another in the X direction above the light-emitting diode 4*b*. These two light-emitting diodes 4*c*, 4*d* form a second portion 6 of the light source 1 for each of the light sources 1.

It is quite possible to provide more or fewer light-emitting diodes 4*a*, 4*b*, 4*c*, 4*d* per portion 5, 6. Furthermore, it is possible to provide more than two portions 5, 6 of the light exit surface of the respective light source 1. For example, it may be provided that at least one of the light sources 1, preferably each of the light sources 1, comprises two to six light-emitting diodes 4*a*, 4*b*, 4*c*, 4*d*. Alternatively, more than six light-emitting diodes 4*a*, 4*b*, 4*c*, 4*d* may be provided per light source 1. If there are two light-emitting diodes 4*a*, 4*b*, 4*c*, 4*d*, the first and second portions 5, 6 each consist of one light-emitting diode 4*a*, 4*b*, 4*c*, 4*d*. If there are more than two light-emitting diodes 4*a*, 4*b*, 4*c*, 4*d*, the first and/or the second and/or optionally a further portion 5, 6 and/or optionally several further portions 5, 6 may have more than one light-emitting diode 4*a*, 4*b*, 4*c*, 4*d*.

It may be provided that the active surfaces of the light-emitting diodes 4*a*, 4*b*, 4*c*, 4*d* of the at least one light source 1, preferably the active surfaces of the light-emitting diodes 4*a*, 4*b*, 4*c*, 4*d* of each of the light sources 1, have a size of 0.5 $mm^2$ to 1.0 $mm^2$. In particular, the total active surface area of the light-emitting diodes of a light source can be equal to 6 $mm^2$ or less than 6 $mm^2$ in size.

The two portions 5, 6 of each of the light sources 1 or the light-emitting diodes 4*a*, 4*b*, 4*c*, 4*d* forming the portions 5, 6 can be controlled separately. When switched on, the light emitted by the light-emitting diodes 4*a*, 4*b* of the first portion 5 can generate a first light function, which is, for example, a high beam. Furthermore, when switched on, the light emitted by the light-emitting diodes 4*c*, 4*d* of the second portion 5 can generate a second light function which is, for example, a low beam or part of a low beam.

The embodiment of the collimating optics 2 shown in the figures is designed in one piece and is configured such that the light emitted by the light sources 1 passes at least partially through the collimating optics 2 during operation of the lighting device. In the embodiment shown, the collimating optics 2 has a row of three collimating lenses 7 arranged next to one another in the first direction X.

If more than one row of light sources 1 is provided, the collimating optics 2 will also have more than one row of collimating lenses 7. In this case, the rows of collimating lenses 7 are arranged in the same manner as the light sources 1 in the second direction Y or, in FIG. 1, one below the other.

It is quite possible to provide more than three or fewer than three collimating lenses 7 per row. It is also possible not to connect the collimating lenses 7 of the collimating optics 2 in one piece, but to form them on separate substrates, wherein the substrates can be arranged next to one another in the first and/or the second direction X, Y. This can result in a column-by-column division or a line-by-line or row-by-row division of the collimating optics 2 into a plurality of substrates.

The collimating lenses 7 each have an entry surface 8 facing the light sources 1 and an exit surface 9 opposite the entry surface 8. A collimating lens 7 is assigned to each of the light sources 1 and arranged in front of the light source 1 in such a manner that the light emitted by the light sources 1 is largely collimated by the collimating lens 7 assigned in each case.

In the illustrated embodiment example, the secondary optics 3 has a transparent substrate with an entry surface 10 and an exit surface 11, through which the light emitted by the collimating optics 2 can at least partially pass. It is quite possible to provide more than one transparent substrate of the secondary optics 3, through which the light emitted by the collimating optics 2 can at least partially pass in succession.

An array of structures, in particular an array of cylindrical lenses, can be arranged on the entry surface 10 and/or on the exit surface 11 of the secondary optics 3. In this case, the cylindrical lenses are arranged next to one another in the first direction X, wherein the cylindrical axes of the cylindrical lenses extend in the second direction Y. This arrangement of the cylindrical lenses achieves a horizontal spread of the light distribution generated by the lighting device into the exterior space of the motor vehicle.

The cylindrical lenses of the array may have a spherical or aspherical cross-section. They may also have a cross-section that corresponds to a portion of a sine function. Furthermore, the cylindrical lenses may have an angular or polygonal cross-section.

Instead of cylindrical lenses, the structures of the array may be designed as light deflection elements, in particular as prisms.

The optics of the lighting device formed by the collimating optics 2 and the secondary optics 3 image the light exit surfaces of the light sources 1 into the exterior space of the motor vehicle. In this case, the second portion 6 of the respective light source 1 has an edge 12 arranged in the light exit surface, which faces the first portion 5 of the respective light source 1. When the light-emitting diodes 4*a*, 4*b* of the first portion 5 are switched off and the light-emitting diodes 4*c*, 4*d* of the second portion 6 are switched on, this edge 12 of the second portion 6 arranged in the light exit surface is imaged by the optics of the lighting device as a horizontal cut-off line into the exterior space of the motor vehicle.

LIST OF REFERENCE NUMERALS

1 light source
2 collimating optics
3 secondary optics
4*a*, 4*b*, 4*c*, 4*d* light-emitting diode
5 first portion of the light exit surface of the light source
6 second portion of the light exit surface of the light source
7 collimating lens
8 entry surface of the collimating lens
9 exit surface of the collimating lens
10 entry surface of the secondary optics
11 exit surface of the secondary optics
12 edge of the second portion of the light exit surface
X first direction
Y second direction
Z third direction The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A lighting device for a motor vehicle, comprising:

a plurality of light sources from which light is emitted during operation of the lighting device;

a collimating optic comprising a plurality of collimating lenses arranged next to one another in a row extending in a first direction, wherein the collimating lenses each have an entry surface and an exit surface through which the light emitted by the plurality of light sources passes in succession during operation of the lighting device;

a secondary optic with at least one array of structures, wherein, during operation of the lighting device, at least a portion of the light emitted by the collimating optic passes through the at least one array of structures;

wherein at least one light source of the plurality of light sources has a light exit surface with at least two separately controllable portions comprising a first portion and a second portion, wherein the first portion includes at least two light-emitting diodes arranged one above the other, and wherein the second portion is above the first portion and includes at least two light-emitting diodes arranged one beside the other, such that the second portion defines a lower edge that extends laterally, wherein the lighting device is configured such that light emitted from the first portion generates a first light function and light emitted from the second portion generates a second light function, and wherein the collimating optic and the secondary optic are configured to project the lower edge as a horizontal cut-off line toward an exterior space.

2. The lighting device of claim 1, wherein the first light function is a high beam and the second light function is a low beam.

3. The lighting device of claim 1, wherein the at least two light-emitting diodes of the first portion are arranged next to one another in a vertical direction.

4. The lighting device of claim 1, wherein the collimating optic and the secondary optic are configured to direct light from the light exit surface of the at least one light source towards the exterior space.

5. The lighting device of claim 1, wherein the light-emitting diodes of the first portion and of the second portion include active surfaces of which together form the light exit surface of the at least one light source.

6. The lighting device of claim 5, wherein the at least one light source includes a solid-state LED array.

7. The lighting device of claim 5, wherein each of the first portion and the second portion of the at least one light source comprises between two and six light-emitting diodes.

8. The lighting device of claim 5, wherein the active surfaces of each of the one or more light-emitting diodes of the first portion and of the second portion have a size of 0.3 $mm^2$ to 2.0 $mm^2$.

9. The lighting device of claim 5, wherein a cumulative surface area of all the active surfaces of the at least one light-emitting diodes of the first portion and of the second portion is equal to or less than 6.0 $mm^2$.

10. The lighting device of claim 1, wherein each of the plurality of collimating lenses is assigned to a corresponding one of the plurality of light sources, such that light emitted from the plurality of light sources passes successively through the entry surface and the exit surface of a corresponding one of the plurality of collimating lenses.

11. The lighting device of claim 1, wherein the at least one array of structures of the secondary optic comprises an array of lenses.

12. The lighting device of claim 11, wherein the array of lenses are cylindrical lenses.

13. The lighting device of claim 12, wherein the cylindrical lenses are arranged next to one another in the first direction and wherein a cylindrical axis of each of the cylindrical lenses extends in a second direction perpendicular to the first direction.

* * * * *